United States Patent
Morovic et al.

(10) Patent No.: US 10,194,052 B2
(45) Date of Patent: Jan. 29, 2019

(54) POST PROCESSING HALFTONE IMAGES

(71) Applicant: HEWLETT-PACKARD DEVELOPMENT COMPANY, L.P., Houston, TX (US)

(72) Inventors: Peter Morovic, Sant Cugat del Valles (ES); Jan Morovic, Colchester (GB); Michel Georges Encrenaz, Rubi (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/519,927

(22) PCT Filed: Oct. 31, 2014

(86) PCT No.: PCT/EP2014/073489
§ 371 (c)(1),
(2) Date: Apr. 18, 2017

(87) PCT Pub. No.: WO2016/066226
PCT Pub. Date: May 6, 2016

(65) Prior Publication Data
US 2017/0331979 A1   Nov. 16, 2017

(51) Int. Cl.
*H04N 1/60* (2006.01)
*H04N 1/52* (2006.01)
*H04N 1/40* (2006.01)
*G06F 3/12* (2006.01)
*H04N 1/405* (2006.01)

(52) U.S. Cl.
CPC ....... *H04N 1/40075* (2013.01); *G06F 3/1223* (2013.01); *H04N 1/4057* (2013.01); *H04N 1/52* (2013.01)

(58) Field of Classification Search
None
See application file for complete search history.

(56) References Cited

U.S. PATENT DOCUMENTS

| 5,657,137 | A * | 8/1997 | Perumal, Jr. | H04N 1/52 347/43 |
| 6,015,207 | A * | 1/2000 | Winter | B41J 29/393 347/19 |
| 6,040,927 | A * | 3/2000 | Winter | B41J 29/393 358/534 |
| 6,443,556 | B1 * | 9/2002 | Garcia | G06K 15/107 347/14 |
| 6,563,957 | B1 * | 5/2003 | Li | H04N 1/4052 358/3.03 |

(Continued)

FOREIGN PATENT DOCUMENTS

CN    4102789152    11/2012

*Primary Examiner* — Madelein T Nguyen
(74) *Attorney, Agent, or Firm* — HP Inc. Patent Department (57) ABSTRACT

Systems and methods for replacing cells of an image based on some pre-determined metric are described herein. For example, systems and methods described herein may improve the functioning of a standard imaging system. For example, the systems and methods described herein may be used to post-process existing images in an imaging system based on one or more pre-determined metrics and improve the halftone images according to those pre-determined metrics.

20 Claims, 6 Drawing Sheets

(56) References Cited

U.S. PATENT DOCUMENTS

| | | | |
|---|---|---|---|
| 6,950,211 B2* | 9/2005 | Trifonov | G06T 5/002 358/3.26 |
| 7,054,038 B1* | 5/2006 | Ostromoukhov | H04N 1/52 358/3.13 |
| 7,773,256 B2* | 8/2010 | Edge | H04N 1/6016 358/1.9 |
| 8,213,055 B2 | 7/2012 | Morovic et al. | |
| 8,285,055 B1* | 10/2012 | Barnes | G06T 7/337 382/108 |
| 9,380,304 B1* | 6/2016 | Chang | H04N 1/00005 |
| 9,584,700 B2* | 2/2017 | Morovic | |
| 2002/0140983 A1 | 10/2002 | Shimizu | |
| 2002/0186267 A1* | 12/2002 | Velde | H04N 1/40087 347/15 |
| 2004/0109178 A1* | 6/2004 | Couwenhoven | B41J 2/16523 358/1.9 |
| 2005/0036163 A1 | 2/2005 | Edge | |
| 2007/0053003 A1 | 3/2007 | Loce | |
| 2008/0055355 A1* | 3/2008 | Hersch | H04N 1/6025 347/19 |
| 2010/0214576 A1* | 8/2010 | Morovic | H04N 1/52 358/1.9 |
| 2011/0096364 A1 | 4/2011 | Morovic | |
| 2013/0182266 A1 | 7/2013 | Fu | |
| 2013/0215472 A1* | 8/2013 | Rossier | H04N 1/4055 358/3.06 |
| 2014/0016143 A1* | 1/2014 | Morovic | H04N 1/6016 358/1.9 |
| 2015/0156369 A1* | 6/2015 | Reed | H04N 1/32309 382/100 |
| 2015/0324996 A1* | 11/2015 | Rius Rossell | H04N 1/6072 358/3.06 |
| 2015/0373229 A1* | 12/2015 | Morovic | B41J 2/17546 358/1.9 |
| 2016/0034796 A1* | 2/2016 | Morovic | H04N 1/6033 358/3.09 |
| 2016/0037017 A1* | 2/2016 | Morovic | H04N 1/32309 358/3.28 |
| 2016/0057314 A1* | 2/2016 | Morovic | H04N 1/6025 358/3.23 |
| 2016/0155032 A1* | 6/2016 | Morovic | H04N 1/6025 358/504 |
| 2016/0173732 A1* | 6/2016 | Garcia Reyero Vinas | H04N 1/52 386/278 |
| 2016/0182763 A1* | 6/2016 | Morovic | H04N 1/6019 358/3.06 |
| 2016/0198064 A1* | 7/2016 | Bai | H04N 1/54 382/100 |
| 2017/0048420 A1* | 2/2017 | Morovic | G01J 3/46 |
| 2017/0048421 A1* | 2/2017 | Morovic | H04N 1/54 |
| 2017/0126931 A1* | 5/2017 | Morovic | H04N 1/6008 |
| 2017/0257527 A1* | 9/2017 | Encrenaz | B41J 2/2103 |
| 2017/0324884 A1* | 11/2017 | Morovic | H04N 1/6016 |

* cited by examiner

POST PROCESSING HALFTONE IMAGES

BACKGROUND

Imaging systems may be arranged to output an image. They may comprise printing or display systems, wherein an output is either a printed or displayed image. In these cases, color data for the image may be represented in a first color space and it may be necessary to map this color data to a second color space that is used to produce the output. To do this a color mapping may be used. In a halftone imaging system, the color mapping may be followed by a halftoning process so as to reproduce a continuous tone image represented in the second color space using a series of dot shapes. This may allow the continuous tone image to be printed on a printing device with a discrete number of output drop levels. The result of this process is an output in the form of a halftone color separation. The output of any particular imaging system is dependent on the characteristics of the particular color halftone processing pipeline that is used by the imaging system.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to systems and methods for post-processing halftone images. More particularly, certain examples relate to systems and methods for replacing cells of a halftone image based on a pre-determined metric.

Certain examples described herein relate to color mapping in an imaging system. Color mapping is a process by which a first representation of a given color is mapped to a second representation of the same color. Although "color" is a concept that is understood intuitively by human beings, it can be represented in a large variety of ways. For example, in one case a color may be represented by a power or intensity spectrum across a range of visible wavelengths when associated with an observer and an illuminant. However, this is a high dimensionality representation that may be said to lack perceptual meaning and so typically a color model is used to represent a color at a lower dimensionality, e.g. an observer and/or illuminant model may involve a weighted averaging of a spectrum into tristimulus values.

Within this context, a color model may define a color space. A color space in this sense may be defined as a multi-dimensional space, wherein a point in the multi-dimensional space represents a color value and dimensions of the space represent variables within the color model. For example, in a Red, Green, Blue (RGB) color space, an additive color model defines three variables representing different quantities of red, green and blue light. Other color spaces include: a Cyan, Magenta, Yellow and BlacK (CMYK) color space, wherein four variables are used in a subtractive color model to represent different quantities of colorant, e.g. for a printing system; the International Commission on Illumination (CIE) 1931 XYZ color space, wherein three variables ('X', 'Y' and 'Z' or tristimulus values) are used to model a color, and the CIE 1976 (L*, a*, b*—CIELAB) color space, wherein three variables represent lightness ('L') and opposing color dimensions ('a' and 'b'). Certain color models, such as RGB and CMYK may be said to be device-dependent, e.g. an output color with a common RGB or CMYK value may have a different perceived color when using different imaging systems. New color spaces may also generated by extending given color models, e.g. references to an RGB color space also apply to an RGB-based color space, e.g. one with additional parameters to model the image output. In the description below color spaces that use a model of limited dimensionality to quantify and describe human color perception are described as colorimetric. For example, reference to "colorimetry" may refer to at least one of the RGB, XYZ and LAB color spaces, or a color space derived from one of these color spaces.

When working with color spaces, the term "gamut" refers to a multi-dimensional volume in a color space that represents color values that may be output by the imaging system. A gamut may take the form of an arbitrary volume in the color space wherein color values within the volume are available to the imaging system but where color values falling outside the volume are not available. The terms color mapping, color model, color space and color gamut, as explained above, will be used in the following description.

Figure 1A:
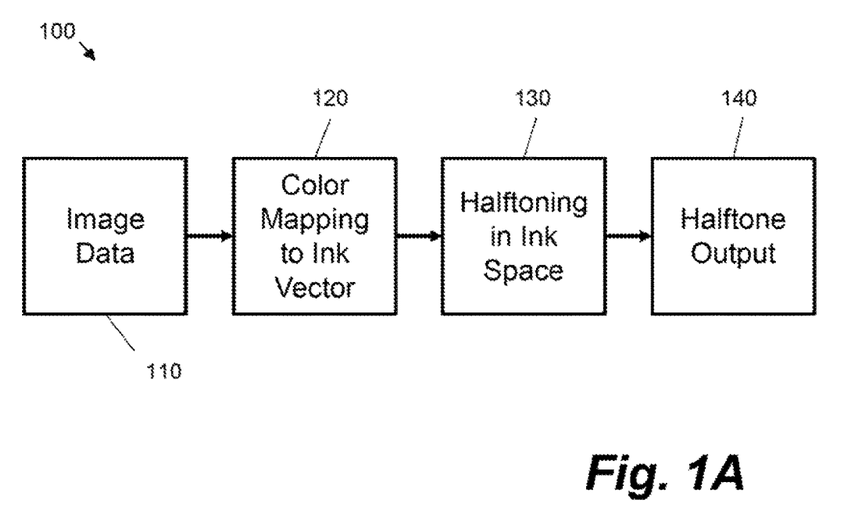
FIG. 1A is a schematic diagram of a first image processing pipeline according to an example.
Figure 1B:
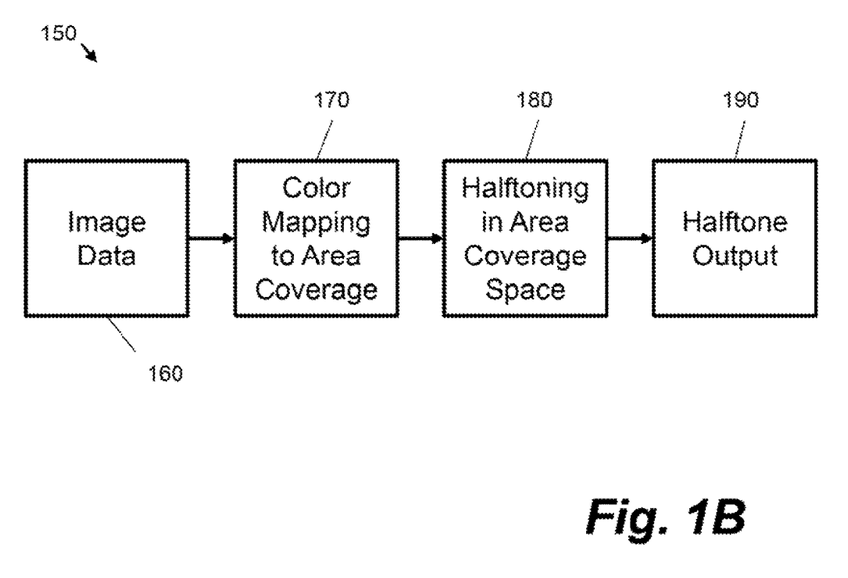
FIG. 1B is a schematic diagram of a second image processing pipeline according to an example.

FIG. 1A shows an example of a first image processing pipeline 100. Certain examples described herein emulate a first image processing pipeline 100. This post processing may be performed by way of a second image processing pipeline 150 as shown in FIG. 1B. In the example of FIG. 1A, image data 110 is passed into a color mapping component 120. The image data 110 may comprise color data as represented in a first color space, such as pixel representations in an RGB color space. The color mapping component 120 maps the color data from the first color space to a second color space.

In the first image processing pipeline 100, color mapping component 120 maps color data from a first color space to a colorant color space so as to generate a color separation. For example, the colorant color space may be a CMYK color space and the color separation may comprise a set of colorant vectors, e.g. each RGB pixel value may be mapped to a CMYK pixel value, wherein the CMYK pixel value denotes a proportion of colorant (e.g. [10, 125, 80] may be mapped to [0.92, 0.0, 0.36, 0.51]). The proportion of each colorant may be represented by a fraction (e.g. 0 to 1) or a percentage (e.g. 0 to 100%). The colorants used within the colorant space may vary depending on a desired printing device, e.g. six colorants may be used in association with a CMYKcm printing device.

The color separation generated by the color mapping component 120 comprises continuous tone data, i.e. each colorant is denoted using a continuous range. In the context of the first image processing pipeline 100, the term "color separation" refers to the output of a color mapping in a colorant space. In certain cases, a color separation may comprise multiple colorant images or components, e.g. one for each colorant in a printing system. For ease of explanation, the term "color separation" will be used herein to refer to the result of combining each of the multiple colorant components, rather than each of the colorant components themselves.

In the first image processing pipeline 100, following the generation of a color separation, a halftoning component 130 applies a halftoning operation to the continuous tone data to generate a halftone output 140. The halftoning operation uses a series of geometric shapes to convert the continuous tone data of the color separation to a discrete tone data, e.g. data comprising a discrete number of color levels. For example, if an image is to be printed on a binary level printing device (e.g. with either 0% or 100% colorant per pixel) then a halftoning component 130 may generate a halftone output with two discrete tone levels per colorant. Typically, a series of dots are used to replicate the continuous tone data, wherein each dot comprises a solid color and a variation in one or more of dot size, dot shape and dot spacing simulates a continuous tone when viewed from a distance. The halftone output may be referred to herein as a halftone image.

FIG. 1B shows an example of a second image processing pipeline 150. Like the first image processing pipeline 100, the second image processing pipeline 150 receives image data 160 that is passed into a color mapping component 170. The image data 160 may comprise color data as represented in a first color space, such as pixel representations in an RGB color space. The color mapping component 170 maps the color data from the first color space to a second color space. In contrast to the first imaging pipeline 100, and as discussed in more detail below, the second color space in the second image processing pipeline 150 comprises an area coverage space, for example a Neugebauer Primary area coverage (NPac) color space. In the case of the second image processing pipeline 150, area coverage color space is used as a domain within which the color mapping component 170 and a halftoning component 180 communicate, i.e. an output color is defined by an area coverage representation that specifies a particular area coverage of a particular colorant combination. This area coverage representation may comprise an NPac vector. This is in contrast to the first image processing pipeline 100 wherein color mapping is performed to a colorant, e.g. ink, vector space, and then halftoning is performed on continuous tone data in the colorant vector space to generate an output image. In FIG. 1B, the halftoning component 180 is configured to distribute the proportions of colorant as defined by the area coverage representations. As such, in the second image processing pipeline, a halftone image 190 on a substrate comprises a plurality of pixels or dots wherein the spatial density of the pixels or dots is defined in area coverage color space and controls the colorimetry of an area of the image, i.e. halftoning component 180 implements the area coverages as defined in the area coverage representation. An example of an imaging system that uses area coverage representations in image processing is a Halftone Area Neugebauer Separation (HANS) pipeline.

As described above, certain examples herein are arranged to output color data in an area coverage color space. This may be a Neugebauer Primary area coverage (NPac) space. An NPac space provides a large number of metamers that facilitate the emulation of a first image processing pipeline that uses separate color mapping to colorant and haiftoning processes. An NPac represents a distribution of one or more Neugebauer Primaries (NPs) over a unit area. For example, in a binary (bi-level) printer, an NP is one of $2^k$ combinations of k inks within the printing system. For example, if a printing device uses CMY inks there can be eight NPs, these NPs relate to the following: C, M, Y, C+M, C+Y, M+Y, C+M+Y, and W (white or blank indicating an absence of ink). Other examples may also incorporate multi-level printers, e.g. where print heads are able to deposit N drop levels, in this case an NP may comprise one of $N^k$ combinations of k inks within the printing system. Although certain printing device examples are described with reference to one or more colorant levels, it should be understood that any color mappings may be extended to other printing fluids such as glosses and/or varnishes that may be deposited in a printing system and that may alter a perceived output color; these may be modelled as NPs.

Figure 1C:
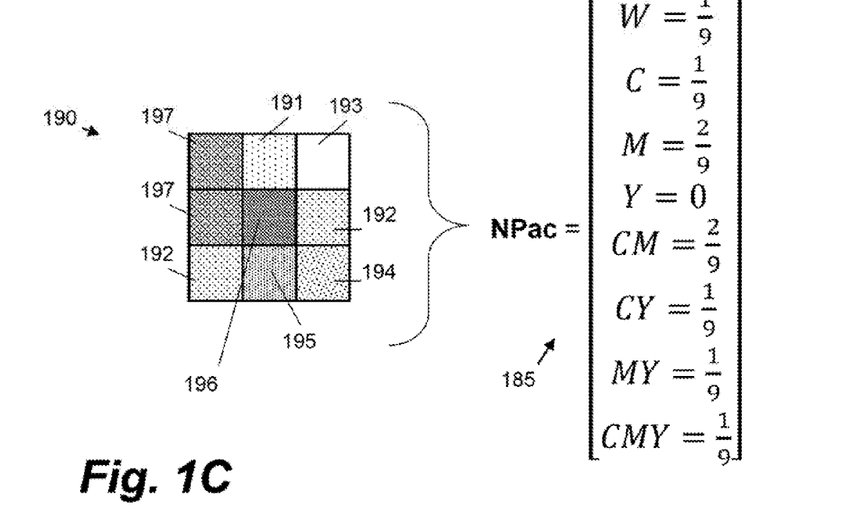
FIG. 1C is a schematic diagram showing a representation of a Neugebauer Primary area coverage vector according to an example.

FIG. 1C shows an example NPac vector 185 for use in a CMY imaging system. This example shows a three-by-three pixel area 190 of a print output where all pixels have the same NPac vector: vector 185. The NPac vector 185 defines the probability distributions for each NP for each pixel, e.g. a likelihood that $NP_x$ is to be placed at the pixel location. Hence, in the example print output there is one pixel of White (W) (193); one pixel of Cyan (C) (191); two pixels of Magenta (M) (192); no pixels of Yellow (Y); two pixels of Cyan+Magenta (CM) (197); one pixel of Cyan+Yellow (CY) (194); one pixel of Magenta+Yellow (MY) (195); and one pixel of Cyan+Magenta+Yellow (CMY) (196). Generally, the print output of a given area is generated such that the probability distributions set by the NPac vectors of each pixel are fulfilled. For example, the NPac vector may be effected by a halftone stage that implements the spatial distribution of colorants defined by the vector, e.g. via a series of geometric shapes such as dots of predetermined sizes being arranged at predetermined angles. As such, an NPac vector is representative of the ink overprint statistics of a given area. Although CMY system is used for ease of explanation, other imaging systems may be used.

As discussed above, an example of an imaging system that uses NPac values in image processing is a HANS pipeline. Implementation of such a HANS pipeline can require certain hardware in the imaging system. However, all imaging systems may not have the appropriate hardware. Accordingly, in some examples, systems and methods are described herein that advantageously provide some of the benefits of a HANS pipeline, without necessarily requiring all the same hardware as is needed for a HANS pipeline. Thus, in some examples, the systems and methods described herein improve the functioning of a standard imaging system. For example, the systems and methods described herein may be used to post-process existing images (e.g., halftone images) in an imaging system based on one or more predetermined metrics (e.g., ink-use, robustness, grain, etc. and/or explicit choices about halftone properties such as favoring overprinting or blank media, etc.) and improve the halftone images according to those pre-determined metrics. The methods described herein may be implemented in imaging systems or other computing devices as software and/or hardware. The systems described herein may comprise such imaging systems or other computing devices.

In some examples, the systems and methods described herein relate to halftone colorimetry (e.g., CIE 1931 XYZ color space, CIE 1976 (L*, a*, b*—CIELAB) color space, etc.) prediction of a halftone image coupled with a segmentation of the halftone image into cells and/or windows (e.g., 2×2, 4×4, N×N, N×M pixels of the halftone image, etc., where N and M are positive integers). For example, the halftone image may be divided into cells and/or windows (also referred to herein as "image cells" or "image windows") and the colorimetry (also referred to as "colorimetric value") of each of the cells and/or windows may be predicted or estimated, such as using color mapping or prediction techniques. Each original cell and/or window of a halftone image may be compared with a replacement cell and/or window having the same or a similar colorimetry based on the one or more pre-determined metrics. The replacement cell and/or window may be an optimized halftone cell and/or window, e.g. optimized using a HANS pipeline. The replacement cell and/or window may comprise an area coverage representation such as an NPac. The area coverage representation may be used to control the spatial distribution of a halftone image, e.g. used to generate a halftone image by specifying the spatial distribution of colorants.

If the replacement cell and/or window is an improvement over the original cell and/or window in the halftone image based on the one or more predetermined metrics, e.g. if it has a higher or lower predetermined metric value depending on the implementation, it may be used to replace the original cell and/or window in the halftone image. In examples where multiple predetermined metrics are used, a weighted average, or some other formula may be used to compare the multiple predetermined metrics and make a decision regarding replacement. In some examples, each metric may have the same weight. In some examples, different metrics may have different weights based on their importance. Comparisons discussed below of one or more predetermined metrics may be based on assigning predetermined metric values to given cells, windows, and/or patches based on some formula (based on one or more predetermined metrics) and comparing the predetermined metric values.

In some examples, the replacement cells and/or windows may be determined based on a pre-computed lookup table that is optimized (e.g., HANS optimized) in terms of one or more pre-determined metrics. For example, in some cases, the pre-computed lookup table may be a lookup table that associates or maps colorimetry with area coverage representations and/or halftone cells directly (e.g., halftone cells of a given size). It should be noted that a given colorimetry in the lookup table may have more than one area coverage representation and/or halftone cell associated with it. Accordingly, the estimated color of a given original cell and/or window of a halftone image may be looked up in the lookup table and one or more associated area coverage representations and/or halftone cells selected for comparison to the original halftone cell based on the one or more pre-defined metrics. In some examples where the replacement cells and/or windows have an associated NPac vector, each NPac vector may be used to generate one or more halftones and those halftones may be compared to the original halftone cell and/or window based on the one or more pre-determined metrics. In some other examples, the NPac vectors may be directly compared to the original halftone cell and/or window. In examples where the original halftone cell and/or window is replaced with an NPac, the NPac may be used to generate a halftone for the cell and/or window using color mapping techniques.

In some examples, the predetermined metric values for each of the replacement cells and/or nodes is pre-computed and stored along with the replacement cells and/or windows, as opposed to calculating them on the fly. In other examples, the predetermined metric values may be calculated on the fly.

Accordingly, the systems and methods allow for a color-dependent replacement of cells and/or windows based on not only optimization in view of one or more pre-defined metrics, but also based on the predicted or estimated colorimetry of the original halftone cells and/or windows.

In some examples, the systems and methods described herein may be used to replace "gray" halftones that use colored dots other than black (K), i.e., halftones that have a gray visual perception or color, with halftones that use only K dots.

In some examples, the colorimetry of the replacement cell and/or window may not exactly match the estimated colorimetry of the original cell and/or window. For example, accuracy of colorimetry may be traded-off for improvement in view of the one or more pre-determined metrics. In such examples, there may be a particular threshold or range of colorimetry that the replacement cell and/or window can have. Alternatively or additionally, the level of the threshold or range of colorimetry may be based on a degree of improvement of the one or more pre-determined metrics. For example, a greater improvement may correspond to a greater allowed level of the threshold or range of colorimetry for the replacement cell and/or window.

In some examples, the colorimetry of a cell and/or window of a halftone image, for example when the cell and/or window comprises an NP, may be estimated or predicted by computing a colorimetry of an NPac that surrounds the cell and/or window (e.g., an N×N window's NPac, where N is an integer greater than or equal to 2) and assigned that colorimetry as the estimated/predicted colorimetry of the cell and/or window.

It should be noted that when referring to a halftone image, in some examples, the halftone image comprises a digital representation of an image in a digital format, such as GIF, JPEG, RAW, TIFF, etc. Accordingly, any comparison and/or replacement of cells and/or windows may be performed digitally to the digital representation of the image.

Figure 2:
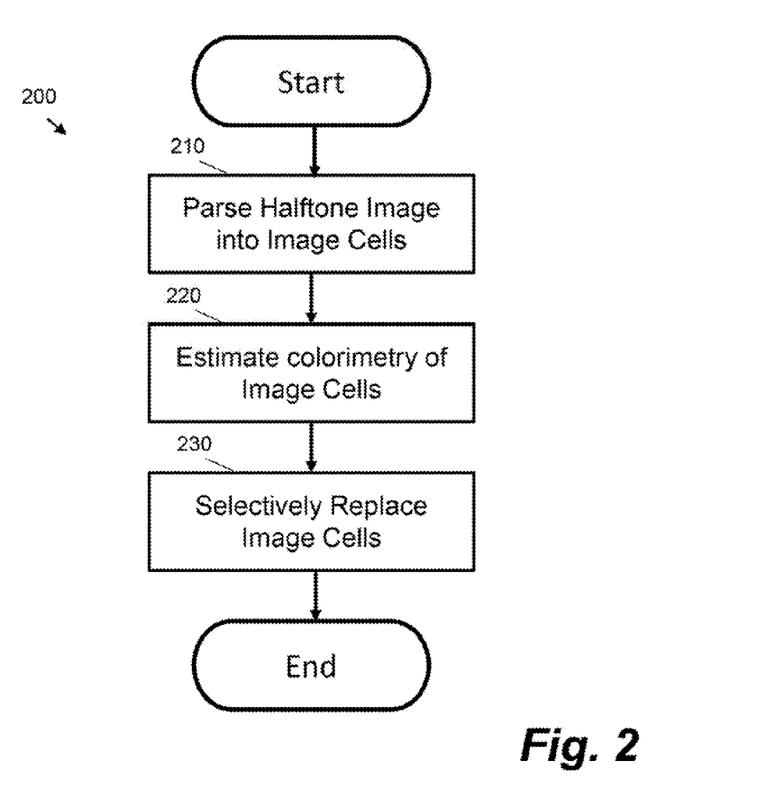
FIG. 2 is a flow chart showing a method for post-processing a halftone image according to an example.

FIG. 2 shows a method for post-processing a halftone image according to an example. At a block 210 a halftone image is parsed into a set of image cells and/or windows. At a block 220 an estimated colorimetric value is determined for each of the image cells and/or windows. At a block 230, at least one of the image cells and/or windows is replaced with a replacement cell and/or window. The replacement cell and/or window has an area coverage representation, e.g. an NPac vector defines the composition and subsequently the color of the replacement cell and/or window. This area coverage representation also has an associated replacement colorimetric value, e.g. a color value in a CIE XYZ or LAB based color space that represents the color of the replacement cell and/or window. The block 230 is based on comparing the replacement colorimetric value to the estimated colorimetric value of the at least one of the image cells and/or windows. For example, a match between colorimetric color values, which may be exact or within a predetermined color difference threshold, may be determined. The selective replacing at the block 230 is further based on comparing a value of a pre-determined metric for the replacement cell and/or window to a value of the pre-determined metric for the at least one of the image cells and/or windows. This pre-determined metric may be an imaging attribute, e.g. that measures predicted ink-use, robustness, grain, etc. of an image output and/or explicit choices about halftone properties such as favoring overprinting or blank media, etc.

The output of the method is a post-processed halftone image. This post-processed halftone image has a second set of imaging characteristics, e.g. as compared to a first set of imaging characteristics exhibited by the input halftone image. The set of imaging characteristics may be associated with the pre-determined metric, e.g. may comprise a value of one or more metrics that are calculated with respect to the whole or a portion of the images. For example, the input halftone image may use a first quantity of ink and the post-processed halftone image may use a second quantity of ink, where the second quantity of ink is lower. At a practical level, the print data for the post-processed halftone image will differ from the print data for the input halftone image.

In one case, in the example described above, the replacement cell and/or window may be selected based on a color mapping from a colorimetric value, representative of the image cell and/or window, to an area coverage representation, the area coverage representation being embodied in the replacement cell and/or window. The color mapping may be performed based on one or more lookup tables as described in more detail below. As such, this color mapping may form part of the comparing block, e.g. a match (in some cases within a given tolerance) may represent that an input estimated colorimetric value from an image cell maps to a particular area coverage representation using a lookup table, e.g. the particular area coverage representation has a replacement colorimetric value that is equal to the input estimated colorimetric value.

Figure 3:
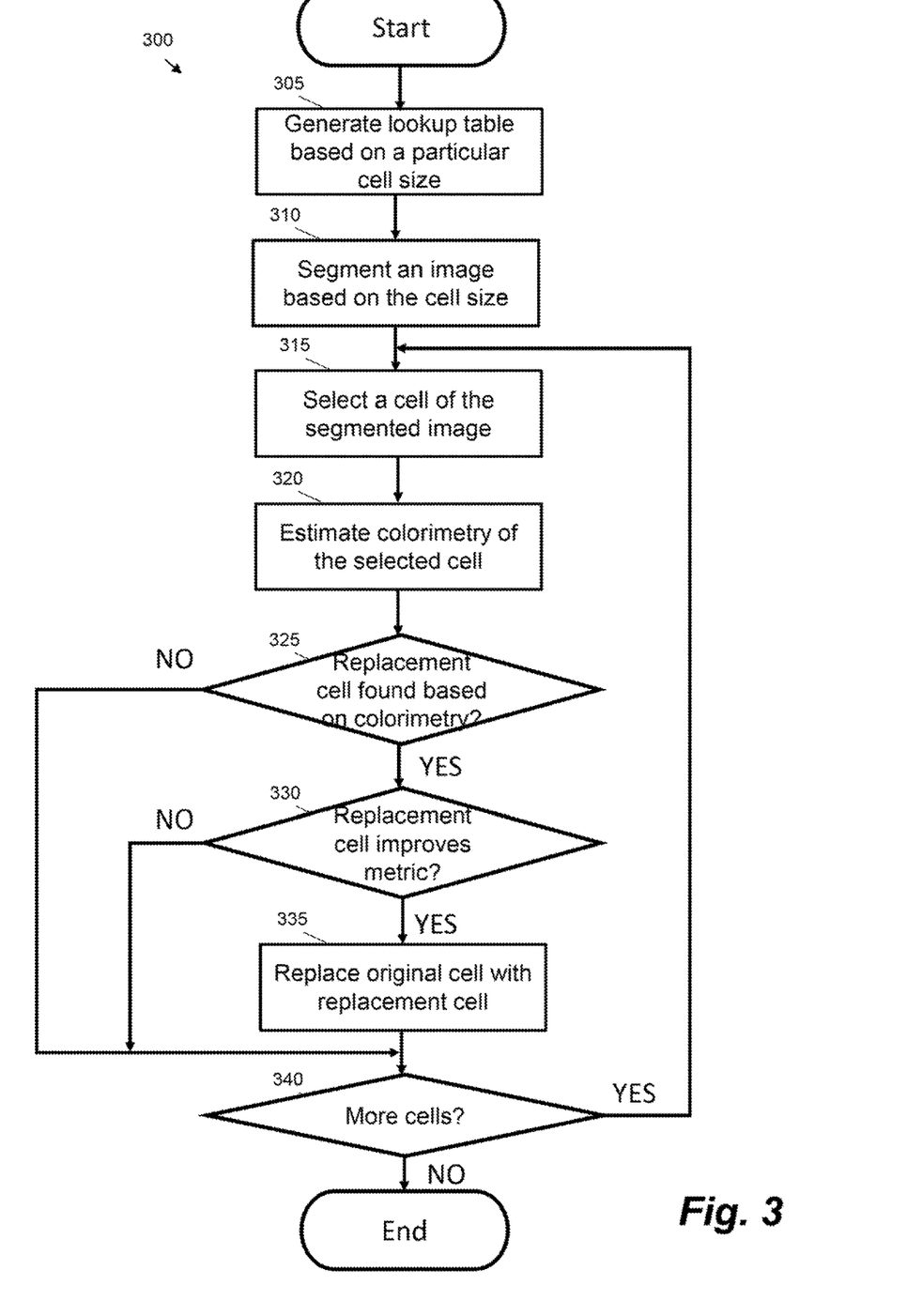
FIG. 3 is a flow chart showing a method for post-processing a halftone image according to another example.

FIG. 3 shows a method 300 for post-processing a halftone image based on one or more pre-determined metrics according to an example. At a block 305, a lookup table is generated associating colorimetry with NPacs and/or halftones. The lookup table is generated based on one or more pre-determined metrics as discussed above. Further, the lookup table may be generated based on the use of a particular window and/or cell size (e.g., 2×2, 4×4, N×N, N×M pixels of the halftone image, etc., where N and M are positive integers) for predicting or estimating colorimetry of windows/cells of a halftone image. Each of the replacement cells and/or windows of the lookup table may be of the particular window and/or cell size or may at least take a minimum possible area coverage into account. For example, if the window size is 2×2 then a minimum area coverage representation is associated with a pixel of that window, e.g. an area coverage no less than a quarter of the window or $1/(N_1*N_2)$ in general where $N_1*N_2$ is the window size. In implementations where a window size is larger, e.g. 4×4, a replacement window could be 4×4 or 2×2. Further, at a block 310, the halftone image is parsed, e.g. segmented, into windows and/or cells of the particular size. Continuing, at a block 315, a window and/or cell of the segmented halftone image is selected that has not been previously processed (e.g., compared against a replacement cell and/or window based on one or more pre-determined metrics).

At a block 320, the colorimetry of the selected window and/or cell is predicted/estimated. Further, at a block 325, one or more replacement cells and/or windows with an associated colorimetry that matches the predicted/estimated colorimetry, or has a colorimetry within a certain threshold or range of the predicted/estimate colorimetry, are selected based on the generated lookup table if they are found in the generated lookup table. In some examples, multiple replacement cells and/or windows are selected. In some examples, only one replacement cell and/or window is selected. For example, the NPacs and/or halftones that are associated with a colorimetry that matches or are within a certain threshold or range of the predicted/estimated colorimetry are selected if the appropriate colorimetry is found in the lookup table. If no appropriate colorimetry is found in the lookup table, the process continues to a block 340. If one or more appropriate colorimetries are found, the process continues to a block 330.

Continuing, at the block 330, the one or more replacement cells and/or windows associated with the appropriate one or more colorimetries are compared to the selected cell and/or window based on the one or more pre-determined metrics as discussed above to see if the one or more replacement cells and/or windows are an improvement over the selected cell and/or window. If the one or more replacement cells are an improvement, one of the one or more replacement cells is selected and the process continues to a block 335. For example, where a plurality of replacement cells and/or windows are compared to the selected cell and/or window and multiple of such plurality of replacement cells and/or windows are an improvement, the replacement cell and/or window with the best one or more pre-determined metrics, e.g. demonstrating the most improvement in value, is selected. If multiple replacement cells and/or windows have a same level of improvement, the replacement cell and/or window with the closest matching colorimetry is selected. If there are multiple such replacement cells and/or windows, one may be selected stochastically (e.g. pseudo-randomly). If the one or more replacement cells are not an improvement, the process continues to the block 340.

Further, at the block 335, the selected cell and/or window is replaced with the selected replacement cell and/or window. Continuing, at the block 340, it is determined if any cells and/or window of the segmented halftone image have not yet been processed. If it is determined that any cells and/or windows have not yet been processed, the process returns to the block 315. If it is determined all the cells and/or windows have been processed, the process ends.

Figure 4:
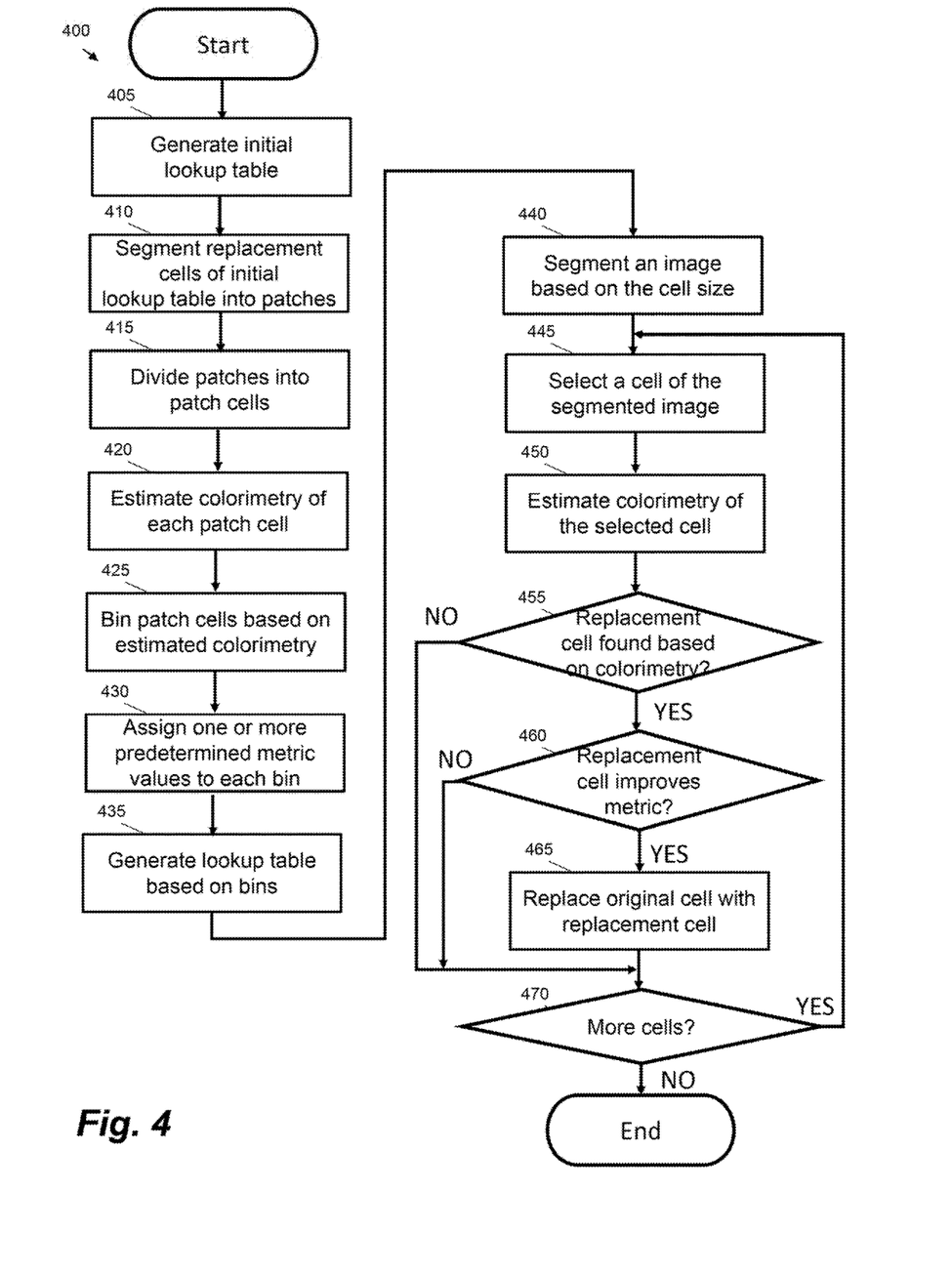
FIG. 4 is a flow chart showing a method for post-processing a halftone image according to another example.

FIG. 4 shows another method 400 for post-processing a halftone image based on one or more pre-determined metrics according to an example. At a block 405, an initial lookup table is generated associating colorimetry with NPacs and/or halftones. The initial lookup table is generated based on one or more pre-determined metrics as discussed above. In certain cases, a plurality of lookup tables may be obtained, e.g. where each lookup table relates to a particular metric. Further, the initial lookup table may be generated without a particular window and/or cell size constraint for predicting/estimating colorimetry of windows/cells of a halftone image. For example, the replacement cells and/or windows in the initial lookup table may not have a size constraint, although in certain cases they may have an area coverage constraint as described above.

Continuing, at a block 410, the initial lookup table is used to create halftone patches of a particular patch size (e.g., 128×128 pixels). For example, if the lookup table maps a RGB or XYZ color value to an NPac vector, the halftone patches may be generated based on the NPac vectors (e.g., using a HANS pipeline). In certain cases, a lookup table may have a particular number of specific mappings or nodes, wherein interpolation is used outside of these mappings or nodes. In this case, the halftone patches may correspond to these mappings or nodes. Further, at a block 415, the halftone patches may be divided into a plurality of patch cells and/or windows of a particular size (e.g., 3×3 pixels).

Continuing, at a block 420, the colorimetry of each of the plurality of patch cells of each of the one or more halftone patches is predicted/estimated. Further, at a block 425, for each halftone patch, each of the plurality of patch cells for the given halftone patch is placed in a bin of one or more bins associated with the given halftone patch based on the predicted/estimated colorimetry of the given patch cell. For example, for a given halftone patch, multiple patch cells of the given halftone patch may have matching colorimetry and are placed in the same bin, while patch cells of different colorimetry are placed in different bins. Further, different halftone patches may have patch cells with matching colorimetry, but those patch cells are placed in different bins, in particular, a bin associated with its respective halftone patch.

Further, at a block 430, for each of the halftone patches, each bin is assigned one or more predetermined metric values based on calculating a predetermined metric value for the overall halftone patch, and not for the individual patch cells within the bin. Continuing, at a block 435, the generated bins of halftone patches may be used to generate a lookup table to replace windows and/or cells of a halftone image. For example, the patch cells in the bins may be used as the replacement cells and/or windows of the lookup table. Each bin has an associated colorimetry, so the colorimetry of the bin is then associated with one or more replacement cells and/or windows to generate the lookup table, where the one or more replacement cells and/or windows are the one or more patch cells in the bin for a given colorimetry. The predetermined metric value associated with each of the colorimetries and the one or more replacement cells of the given colorimetry may be the predetermined metric value associated with the corresponding bin as discussed above. Further, where there may be multiple bins with the same colorimetry due to multiple halftone patches producing patch cells with the same colorimetry, the bin associated with the best (e.g., highest or lowest depending on how the metric value is calculated) predetermined metric value may be used as the bin for a given colorimetry, and the remaining bins with the same given colorimetry may not be used to generate the lookup table.

Further, at a block 440, the halftone image is parsed/segmented into windows and/or cells of the particular size, for example the patch cell size. Continuing, at a block 445, a window and/or cell of the segmented halftone image is selected that has not been previously processed, e.g. compared against a replacement cell and/or window based on one or more pre-determined metrics.

At a block 450, the colorimetry of the selected window and/or cell is predicted/estimated. Further, at a block 455, one or more replacement cells and/or windows with an associated colorimetry that matches the predicted/estimated colorimetry, or has a colorimetry within a certain threshold or range of the predicted/estimate colorimetry, are selected based on the generated lookup table (from block 435) if they are found in the generated lookup table. As discussed above, there may be multiple replacement cells and/or windows selected if the bin associated with that colorimetry that was selected had multiple patch cells and/or if multiple colorimetries of the lookup table are used to find replacement cells such as when using a threshold or range of colorimetries based on the predicted/estimated colorimetry. If no appropriate colorimetry is found in the lookup table, the process continues to a block 470. If one or more appropriate colorimetries are found, the process continues to a block 460.

The check at block 455 may be performed in certain cases. In one case, the lookup table may be specific and limited. For example, the lookup table may cover a selected set of color mappings to area coverage space, e.g. selected RGB/XYZ to NPac mappings. In this case there may not always be a colorimetric value that matches an image cell and/or window. For example, if a constraint is that interpolation is not to be used between nodes of the lookup table then this may be the case, e.g. if specified RGB/XYZ to NPac mappings are to be used. If interpolation is used it may be possible to find a colorimetric value. In a case of a regular, populated and gamut-spanning lookup table an appropriate colorimetry may be found and thus block 455 may not be omitted in one example.

Continuing, at the block 460, the one or more replacement cells and/or windows associated with the appropriate one or more colorimetries are compared to the selected cell and/or window based on the one or more pre-determined metrics as discussed above to see if the one or more replacement cells and/or windows are an improvement over the selected cell and/or window. As discussed above, the predetermined metric value for each replacement cell and/or window is not a predetermined metric value calculated specifically for that cell, but rather a predetermined metric value based on the halftone patch related to the replacement cell and/or window. If the one or more replacement cells are not an improvement, the process continues to the block 470. If the one or more replacement cells are an improvement, one of the one or more replacement cells is selected and the process continues to a block 465. For examples where a plurality of colorimetries, such as when using a threshold or range of colorimetries, are found to be appropriate in the lookup table, the one or more replacement cells and/or windows associated with the colorimetry (or bin) having the best predetermined metric value are used to select the replacement cell and/or window. If only one colorimetry is found to be appropriate in the lookup, the one or more replacement cells and/or windows associated with that colorimetry (or bin) is used to select the replacement cell and/or window. One replacement cell and/or window is then selected from the one or more replacement cells and/or windows from the colorimetry/bin used, for example stochastically.

Further, at the block 465, the selected cell and/or window is replaced with the selected replacement cell and/or window. Continuing, at the block 470, it is determined if any cells and/or window of the segmented halftone image have not yet been processed. If it is determined that any cells and/or windows have not yet been processed, the process returns to the block 445. If it is determined all the cells and/or windows have been processed, the process ends.

The example of FIG. 4 may be applied to a given lookup table that is indexed by RGB or XYZ derived values and that has area coverage representations at its nodes, e.g. NPac vectors. In this case, halftone patches are generated based on each node, e.g. each NPac vector, at a given pixel resolution, e.g. 128 by 128 pixels. These patches are then parsed, e.g. with a smaller window size of 2×2 or 3×3, and the NPac vector of each window is interpreted to predict a colorimetry; this is similar to the process performed on the original input halftone image (e.g. blocks 310 to 320 of FIG. 3). This results in a series of NPac vectors and associated colorimetries that are sub-components of a single lookup table node's NPac vector. Each patch may have more or less redundancy depending on the complexity of the node NPac vector, e.g.

there may be cases where the 3×3 windows of a 128×128 patch only have two types of sub-component because the original NPac is, for example, 50% K. Once the set of sub-component NPac vectors and their associated colorimetries have been generated they may be grouped ("binned"). This may be seen as creating a new lookup table that has the groups (or the centers of the groups) as the indexing domain and a series of NPac vectors at each node. These NPac vectors are then evaluated against the one or more imaging metrics and then a comparison is made with portions of the input halftone image, e.g. a similar comparison to that described with regard to FIG. 3. This may include taking a cell or window of the halftone image, comparing it against the effective new lookup table (e.g. using the new lookup table to determine an NPac vector for an estimated colorimetric value of the cell or window of the halftone image), and comparing one or more imaging metrics.

Figure 5:
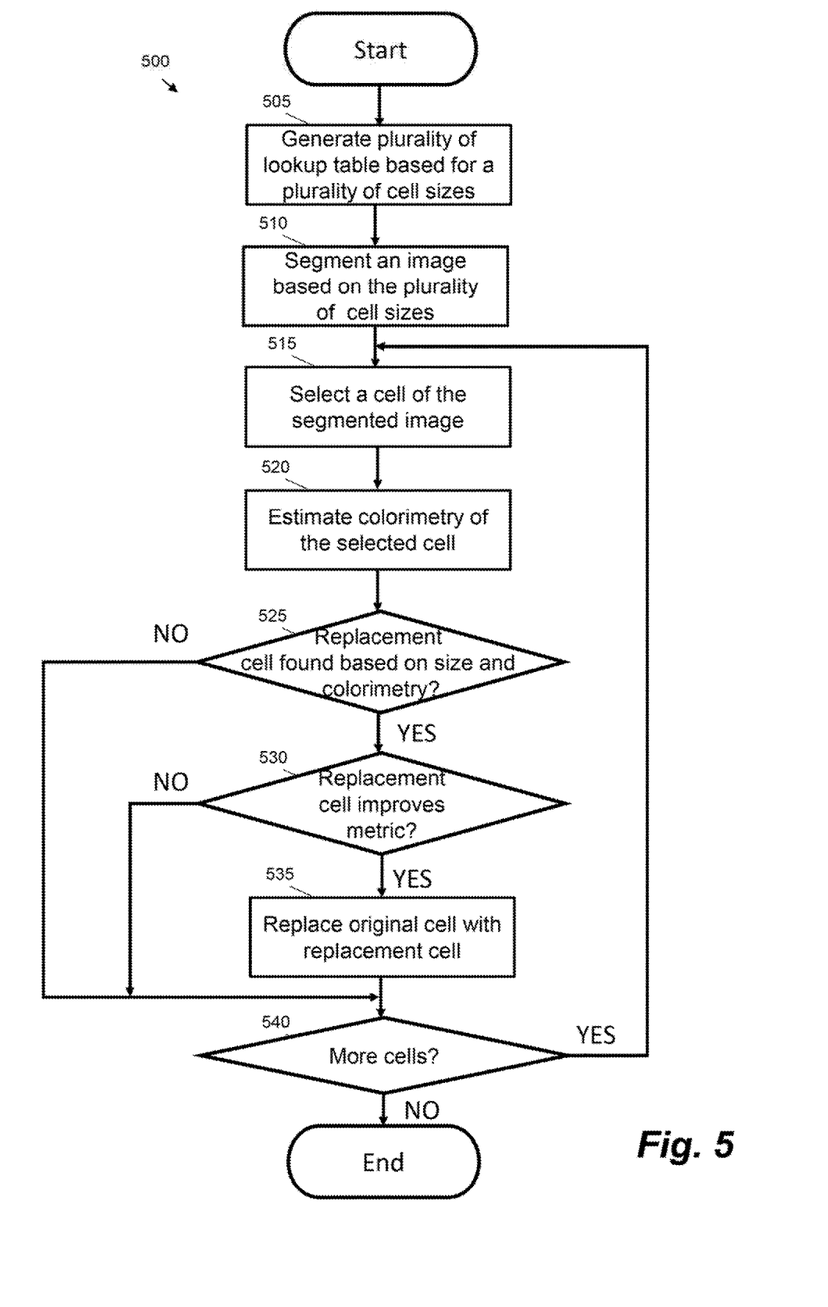
FIG. 5 is a flow chart showing a method for post-processing a halftone image according to another example.

FIG. 5 shows a method 500 for post-processing a halftone image based on one or more pre-determined metrics according to an example. At a block 505, a plurality of lookup tables are generated associating colorimetry with NPacs and/or halftones. The lookup tables are generated based on one or more pre-determined metrics as discussed above. In some examples, the plurality of lookup tables are generated based on a plurality of pre-determined metrics, e.g. each lookup table relates to a different metric. Further, each lookup table may be generated based on the use of a particular window and/or cell size (e.g., 2×2, 4×4, N×N, N×M pixels of the halftone image, etc., where N and M are positive integers) for predicting/estimating colorimetry of windows/cells of a halftone image. For example, each of the replacement cells and/or windows of each lookup table may be of the particular window and/or cell size. Each lookup table may be generated based on a different particular window and/or cell size, meaning there are a plurality of particular window and/or cell sizes for which lookup tables are generated. In certain cases a plurality of lookup tables may be used that relate to one of a plurality of metrics and a plurality of window sizes; in other cases the plurality of lookup tables may relate to a combination of a plurality of metrics and a plurality of window sizes. Further, at a block 510, the halftone image is parsed/segmented into a plurality of windows and/or cells, each of the plurality of windows and/or cells being one of the plurality of particular sizes. The choice/determination of how to parse/segment the halftone image using the plurality of particular sizes to have spatially varying cell sizes for replacement may be based on analyzing the halftone image, such as analyzing the content of the image (e.g., larger cell and/or window sizes are used for darker areas of the halftone image and smaller cell and/or window sizes are used for lighter or busier (more color changes per unit area) areas of the halftone image).

Continuing, at a block 515, a window and/or cell of the segmented halftone image is selected that has not been previously processed, e.g., compared against a replacement cell and/or window based on one or more pre-determined metrics.

At a block 520, the colorimetry of the selected window and/or cell is predicted/estimated. Further, at a block 525, one or more replacement cells and/or windows with an associated colorimetry that matches the predicted/estimated colorimetry, or has a colorimetry within a certain threshold or range of the predicted/estimate colorimetry, are selected. This selection may be performed based on the generated particular lookup table that includes replacement cells and/or windows of the same size as the selected window and/or cell if they are found in that particular lookup table. In some examples, multiple replacement cells and/or windows are selected. In a case where a plurality of lookup tables each relate to a different metric, a plurality of replacement cells and/or windows with matching colorimetries may be selected. In some examples, only one replacement cell and/or window is selected. For example, the NPacs and/or halftones that are associated with a colorimetry that matches or are within a certain threshold or range of the predicted/estimated colorimetry are selected if the appropriate colorimetry is found in the particular lookup table. If no appropriate colorimetry is found in the particular lookup table, the process continues to a block 540. If one or more appropriate colorimetries are found, the process continues to a block 530. As discussed above with reference to FIG. 4, block 525 may only be performed in certain cases where a colorimetric match is not possible.

Continuing, at the block 530, the one or more replacement cells and/or windows are compared to the selected cell and/or window based on the one or more pre-determined metrics as discussed above to see if the one or more replacement cells and/or windows are an improvement over the selected cell and/or window. If a plurality of replacement cells and/or windows are selected as described above, one of said cells and/or windows may be selected that provides an improvement that optimizes a function of one or more imaging metrics. If the one or more replacement cells are an improvement, one of the one or more replacement cells is selected and the process continues to a block 535. For example, where a plurality of replacement cells and/or windows are compared to the selected cell and/or window and multiple of such plurality of replacement cells and/or windows are an improvement, the replacement cell and/or window with the best one or more pre-determined metrics (e.g., most improvement) is selected. If multiple replacement cells and/or windows have the same and most improvement, the replacement cell and/or window with the closest matching colorimetry is selected. If there are multiple such replacement cells and/or windows, one may be selected stochastically (e.g. pseudo-randomly). In certain cases where a plurality of replacement cells are generated based on a respective plurality of lookup tables, one replacement cell may be selected as a function of a plurality of matching replacement cells. If the one or more replacement cells are not an improvement, the process continues to the block 540.

Further, at the block 535, the selected cell and/or window is replaced with the selected replacement cell and/or window. Continuing, at the block 540, it is determined if any cells and/or window of the segmented halftone image have not yet been processed. If it is determined that any cells and/or windows have not yet been processed, the process returns to the block 315. If it is determined all the cells and/or windows have been processed, the process ends.

It should be noted that combinations of the above methods 200-500 may be used to process a single halftone image. For example, some portions of the halftone image may be processed with one method, while other portions of the halftone image may be processed with a different method.

The modified/post-processed halftone image may then be printed using a printer on a substrate such as paper or output on a display device. Such methods and systems described herein may be advantageous as they do not require certain hardware at the printer or display device to improve printing or display based on one or more metrics as the lookup table may be precomputed and only used for lookup at the printer or display device.

Figure 6:
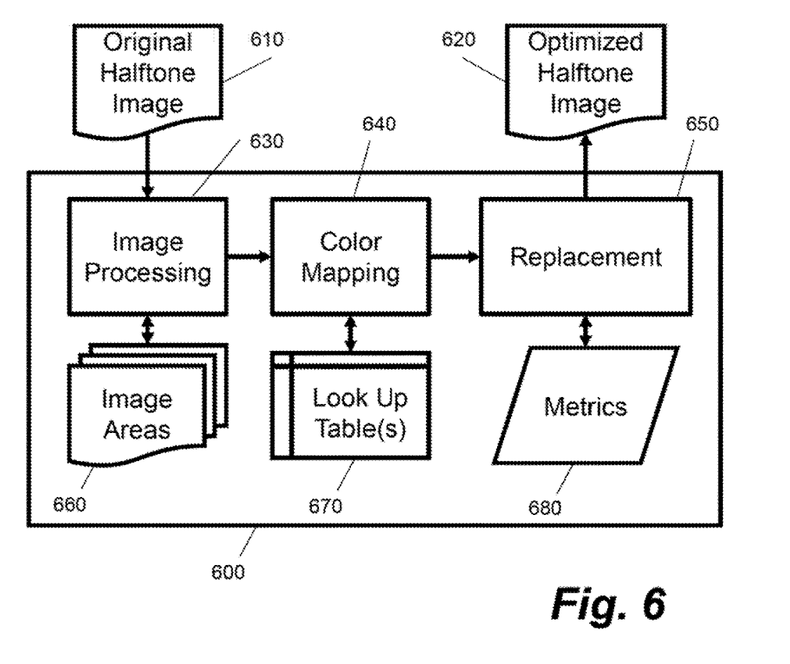
FIG. 6 is a schematic diagram showing an apparatus for post-processing halftone images according to an example.

FIG. 6 shows an example apparatus 600 for post-processing halftone images. For example, the apparatus 600 may be used to implement one or more of methods 200 to 500. The apparatus 600 receives an original halftone image 610, processes said image and generates an optimized halftone image 620. The optimized halftone image 620 may have different image data from the original halftone image 610, e.g. colors within the optimized halftone image 620 may have different representations at the pixel level.

The apparatus 600 comprises an image processing component 630, a color mapping component 640 and a replacement component 650. The image processing component 630 is arranged to apply a sliding window to the original halftone image 610 and predict colorimetry for at least one resulting window area. For example, the image processing component 630 may be arranged to apply a predetermined sliding window function that effectively decomposes the original halftone image 610 into a set of image or window areas 660. In one case, the image processing component 630 is arranged to predict colorimetry for at least one window area by predicting a colorimetric value for an area coverage representation of each window area 660. In a bi-level printer example, if the window area is a 2 by 2 pixel area of the original halftone image 610 then each pixel has a value indicative of one or more colorants to be deposited. This 2 by 2 pixel area may then be represented as an NPac vector; e.g. pixel values of [C=1, M=0, Y=0], [C=1, M=0, Y=0], [C=0, M=1, Y=0] and [C0, M=1, Y=0] may be represented as an NPac vector of [C=0.5, M=0.5. Y=0, C+M=0, C+Y=0, M+Y=0, C+M+Y=0, W=0] for the window area. A colorimetric value, e.g. in an CIE XYZ or LAB color space, for NPac vector may then be predicted using a color mapping, such as a printer model and color model.

The color mapping component 640 is arranged to determine an area coverage representation for a window area based on predicted colorimetry from the image processing component 630. For example, the color mapping component may be arranged to use one or more look up tables 670 to implement a color mapping from a predicted colorimetric value for the window area to an area coverage representation, e.g. an NPac vector. The one or more look up tables 670 may be pre-computed to optimize an imaging metric, e.g. one of ink-use, robustness, grain, etc. and/or explicit choices about halftone properties such as favoring overprinting or blank media, etc. Each look up table 670 may be arranged to output an area coverage representation for a pre-defined size of a window area.

The replacement component 650 is arranged to compare an imaging metric 680 for a window area with a corresponding imaging metric 680 for an area coverage representation associated with the window area received from the color mapping component 640. For example, this may be one of the imaging metrics described above. The comparison may involve a plurality of imaging metrics, in which case a collective function may be evaluated. The replacement component 650 is further arranged to replace image data for the window area with the area coverage representation based on the comparison. This may be equivalent to selecting a new NPac vector that optimizes one or more imaging attributes for the image data for the window area. For example, a 2 by 2 pixel area of the original halftone image 610 may have pixel values of [C=0, M=1, Y=1], [C=0, M=0, Y=0], [C=0, M=1, Y=1] and [C=0, M=0, Y=1] (which may be represented as an NPac vector of [C=0, M=0, Y=0.25, C+M=0, C+Y=0, M+Y=0.5, C+M+Y=0, W=0.25]). These pixel values may then be replaced with pixel values implementing the area coverage representation associated with the window area, e.g. implementing a new NPac vector such as [C=0, M=0.5, Y=0.5, C+M=0, C+Y=0, M+Y=0, C+M+Y=0, W=0]. In this example, both NPac vectors have the same observed "color", but the second NPac vector, e.g. that may form part of the optimized halftone image 620, is optimized to improve one or more imaging metrics.

In one case, the color mapping component is arranged to halftone a set of nodes of a colorimetric-to-area-coverage look-up table to generate a set of halftone patches of a predetermined first size. The set of halftone patches are then divided into a set of cells of a predetermined second size, wherein the colorimetry for each cell in the set of cells is determined and the set of cells by are grouped or binned by the determined colorimetry. In this case the replacement component may be arranged to assign a value of the imaging metric to each group of cells and compare a value of the imaging metric for a window area of the halftone image with a value of the imaging metric for a group of cells that has a colorimetry that matches the colorimetry of the window area. To replace image data the replacement component may be arranged to randomly select a cell within the group of cells and use the data for this cell to replace the image data of the window area. When using stochastic (e.g. random) selection, a series of NPacs or halftone cells per lookup table node are generated. As a consequence some randomness and/or granularity is introduced, while remaining within the domain of the lookup table.

Figure 7:
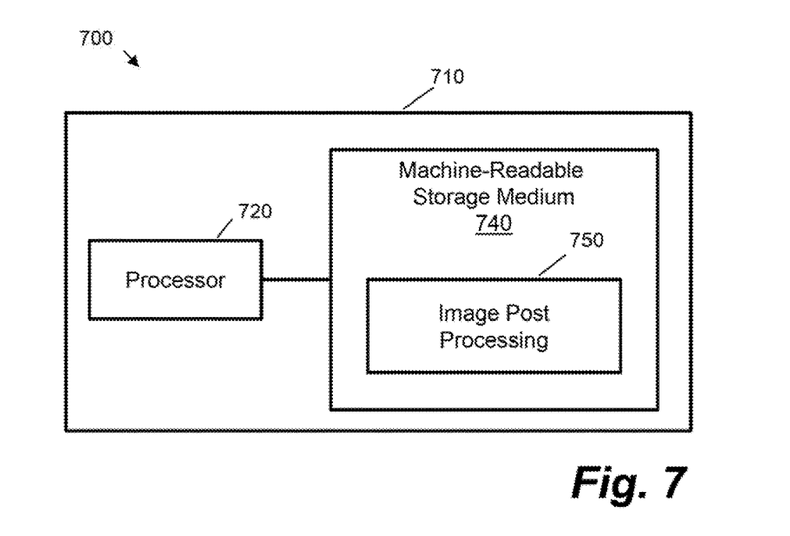
FIG. 7 is a schematic diagram showing a processing device according to an example.

Certain methods and systems as described herein may be implemented by a processor that processes computer program code that is retrieved from a non-transitory storage medium. FIG. 7 shows an example 700 of an imaging system 710 comprising a machine-readable storage medium 740 coupled to a processor 720. In certain case the imaging system 710 may comprise a computer; in other cases the imaging device may comprise a printer, scanner, display device or the like. Machine-readable media 740 can be any non-transitory media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 7, the machine-readable storage medium comprises program code to implement an image post processing 750 such as the methods of image post processing (e.g., methods 200-500) described herein and/or at least a portion of the apparatus 600 of FIG. 6.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for post-processing halftone images, the method comprising:
   parsing a halftone image into a set of image cells, the halftone image generated by halftoning an original image;
   determining an estimated colorimetric value for each of the image cells; and
   selectively replacing at least one of the image cells of the halftone image with a replacement cell, wherein the replacement cell has an area coverage representation with a replacement colorimetric value, wherein the replacing is based on comparing the replacement colorimetric value to the estimated colorimetric value of the at least one of the image cells, wherein the replacing is further based on comparing a value of a pre-determined metric for the replacement cell to a value of the pre-determined metric for the at least one of the image cells, and wherein the halftone image is printed as the original image after the at least one image cell of the halftone image has been replaced with the replacement cell.

2. The method of claim 1, further comprising generating a lookup table that associates a plurality of replacement cells with a plurality of colorimetric values.

3. The method of claim 1, wherein generating the lookup table comprises:
generating a plurality of halftone patches;
parsing each of the plurality of halftone patches into a plurality of patch cells;
determining an estimated colorimetric value for each of the plurality of patch cells of each of the plurality of halftone patches;
placing the plurality of patch cells into a plurality of bins based on the estimated colorimetric value for each of the plurality of patch cells; and
assigning a value of the pre-determined metric to each of the plurality of bins based on a value of the pre-determined metric for an associated halftone patch of the plurality of halftone patches, wherein the replacement cell is one of the plurality of patch cells.

4. The method of claim 3, further comprising selecting the replacement cell from the plurality of patch cells at least in part stochastically.

5. The method of claim 1, wherein a first image cell of the set of image cells is a first size and a second image cell of the set of image cells is a second size that is different than the first size.

6. The method of claim 5, wherein the first size is selected based on content of the first image cell.

7. The method of claim 1, wherein the pre-determined metric is at least one of the following: ink-use, robustness, and grain.

8. The method of claim 1, further comprising:
printing the halftone image as the original image, after the at least one image cell of the halftone image has been replaced with the replacement cell.

9. The method of claim 1, further comprising:
halftoning the original image to generate the halftone image.

10. Apparatus for post-processing halftone images, comprising:
an image processing component arranged to apply a sliding window to a halftone image and predict colorimetry for at least one resulting window area, and is to generate a set of halftone patterns and group by colorimetry a set of cells into which the halftone patches are divided;
a color mapping component arranged to determine an area coverage representation for a window area based on predicted colorimetry from the image processing component;
a replacement component arranged to compare an imaging metric for a window area with a corresponding imaging metric for an area coverage representation associated with the window area from the color mapping component, by comparing a value of the imaging metric for a window area of the halftone image with a value of the imaging metric for the group of cells that has the colorimetry that matches the colorimetry of the window area, wherein the replacement component is further arranged to replace image data for the window area with the area coverage representation based on the comparison.

11. The apparatus of claim 10, wherein the color mapping component is arranged to use one or more look up tables to implement a color mapping from a predicted colorimetric value for a window area to an area coverage representation.

12. The apparatus of claim 11, wherein the one or more look up tables are pre-computed to optimize the imaging metric.

13. The apparatus of claim 11, wherein each look up table is arranged to output an area coverage representation for a pre-defined size of a window area.

14. The apparatus of claim 10, wherein the image processing component is arranged to predict colorimetry for at least one window area by predicting a colorimetric value for an area coverage representation of the window area.

15. The apparatus of claim 10, wherein the color mapping component is arranged to:
generate the set of halftone patterns by halftoning a set of nodes of a colorimetric-to-area-coverage look-up table, the set of halftone patches of a predetermined first size;
divide the set of halftone patches into the set of cells, the set of cells of a predetermined second size; and
determine the colorimetry for each cell in the set of cells, the set of cells grouped by the determined colorimetry,
wherein the replacement component is arranged to:
assign the value of the imaging metric to each group of cells.

16. The apparatus of claim 15, wherein the replacement component is arranged to randomly select a cell within the group of cells to replace the image data of the window area.

17. The apparatus of claim 10, wherein the halftone image is printed as the original image after the replacement component replaces the image data.

18. A non-transitory computer-readable storage medium comprising a set of computer-readable instructions stored thereon, which, when executed by a processing system, cause the processing system to:
obtain a first halftone image having a first set of imaging characteristics, the first halftone image generated by halftoning an original image;
parse the first halftone image into a set of image cells;
determine an estimated colorimetric value for each of the image cells; and
generate a second halftone image having a second set of imaging characteristics by selectively replacing at least one of the image cells with a replacement cell,
wherein the replacement cell has an area coverage representation with a replacement colorimetric value,
wherein the selectively replacement is based on a comparison of the replacement colorimetric value and the estimated colorimetric value of the at least one of the image cells,
wherein the selectively replacement is further based on a comparison of a value of a pre-determined metric for the replacement cell and a value of the pre-determined metric for the at least one of the image cells,
and wherein the halftone image is printed as the original image after the at least one image cell of the halftone image has been replaced with the replacement cell.

19. The non-transitory computer-readable storage medium of claim 18, wherein the instructions, when executed by the processing system, further cause the processing system to:
print the halftone image as the original image, after the at least one image cell of the halftone image has been replaced with the replacement cell.

20. The non-transitory computer-readable storage medium of claim 19, wherein the instructions, when executed by the processing system, further cause the processing system to:
halftoning the original image to generate the halftone image.

* * * * *

UNITED STATES PATENT AND TRADEMARK OFFICE
CERTIFICATE OF CORRECTION

PATENT NO.        : 10,194,052 B2
APPLICATION NO.   : 15/519927
DATED             : January 29, 2019
INVENTOR(S)       : Peter Morovic et al.

It is certified that error appears in the above-identified patent and that said Letters Patent is hereby corrected as shown below:

On the Title Page

Item (56), FOREIGN PATENT DOCUMENTS, in Column 2, Line 1, delete "4102789152" and insert -- 102789152 --, therefor.

Signed and Sealed this
Twenty-seventh Day of August, 2019

Andrei Iancu
*Director of the United States Patent and Trademark Office*